INVENTOR
Louis Joseph Guarino

United States Patent Office 3,454,470
Patented July 8, 1969

3,454,470
DISTILLATION OF LIQUIDS USING SEMI-POROUS AND NON-POROUS CONDUITS IN VACUUM PRESSURE CONTAINER
Louis Joseph Guarino, Box 164,
Washingtonville, N.Y. 10992
Filed May 15, 1967, Ser. No. 639,937
Int. Cl. C02b 1/06; B01d 3/10
U.S. Cl. 202—177      5 Claims

ABSTRACT OF THE DISCLOSURE

An apparatus for distilling fluids which is provided a container having a semiporous conduit and a nonporous conduit disposed in spaced relation in the container and mounted therein. A supply means for the liquid to be distilled is connected to the container and coupled with the semiporous conduit so that the liquid may pass therethrough. A reservoir to contain a fluid coolant is connected to the container and coupled to the non-porous conduit so that the coolant fluid may pass therethrough. Also means are associated with the container to maintain a desired pressure within the container and for the withdrawal of distillate therefrom.

---

This invention relates in general to apparatus for the separation of volatile substance from liquid or fluid mixtures, not only saline water, but any mixture of colloids, proteins and non-dialyzable substances such as disclosed in Patent No. 2,715,097 dated Aug. 9, 1955, issued to John Ralph Guarino.

Existing distillation methods depend upon the evaporation of liquids by its contact with heated surfaces. Such procedures cause a deposit of solids on the heated surface which in turn lowers the effectiveness of the heated surface to evaporate the liquid. This deposit of solids on the heated surface also causes a corrosion of the heated surface. The present invention allows the use of semipermeable membranes which are resistive to corrosion. Evaporation occurs through the pores of the semipermeable membrane material. This procedure eliminates the problems of corrosion and scale deposit which occur in existing distillation methods. This procedure also permits the evaporation of gaseous mixtures as well as liquid mixtures.

Among the objects of the present invention it is aimed to provide a container into which the liquid or fluid mixture, from which volatile substance is to be removed, is introduced and contained within a conduit, and means contained in the container which will condense the separated volatile substance into a liquid as the fluid mixture is discharged from the container.

More specifically, the present invention aims to provide a conduit through which the liquid or fluid mixture passes, which conduit is composed of a material which will selectively permit the passage of volatile susbtance but bar the passage of undesirable constituents of the fluid mixture, to enable the volatile substance to pass from the conduit to be condensed by a condensing medium arranged within a container in which the conduit is located.

It is still another object of the present invention to provide an apparatus containing a conduit through which the liquid or fluid mixture passes, and which conduit is composed of a substance such as cellophane or the like semipermeable material which will permit the volatile substance to pass through the same and be condensed by a condensing medium composed of a non-porous material arranged in a continuous conduit form through which the flow of a distilling medium or coolant such as a cold fluid is contained, and which apparatus is provided with a discharge orifice to permit the removal of the condensed matter, and which apparatus is provided with an orifice to permit the attachment of a vacuum pump thereto.

Figure 1:
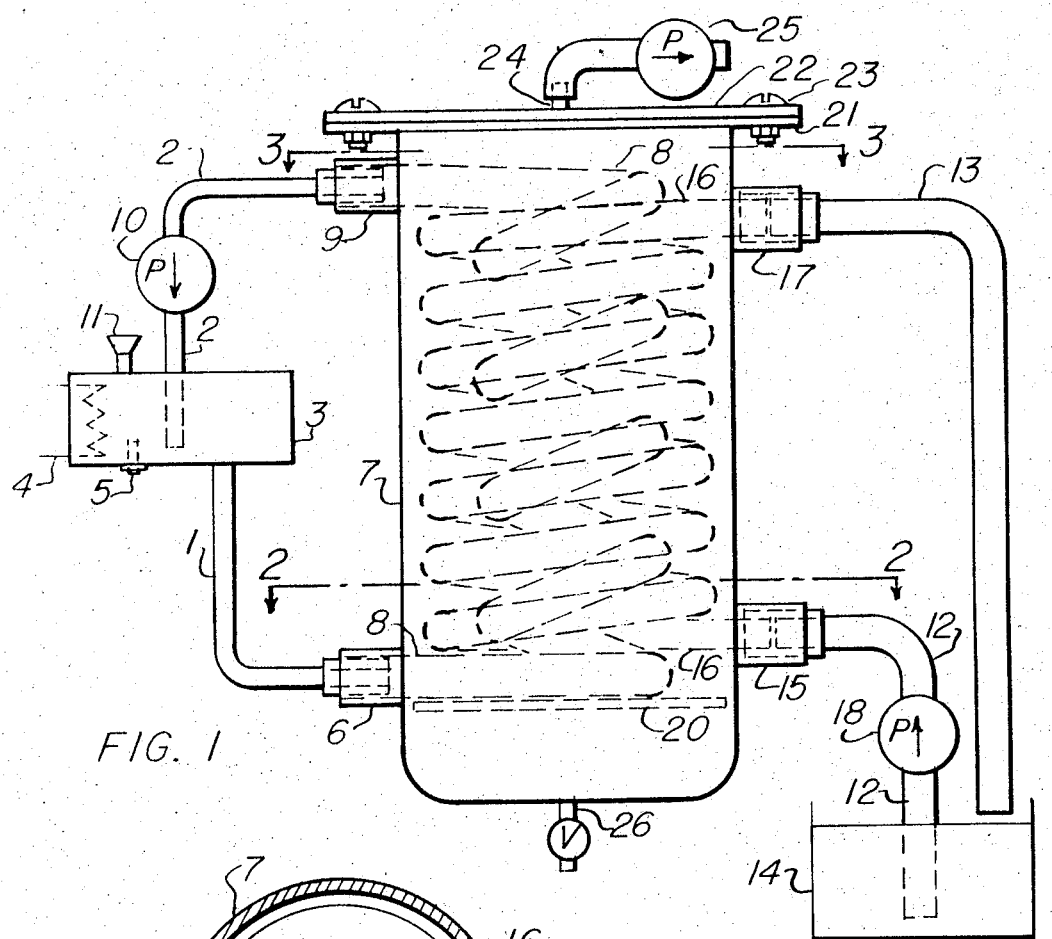
Figure 2:
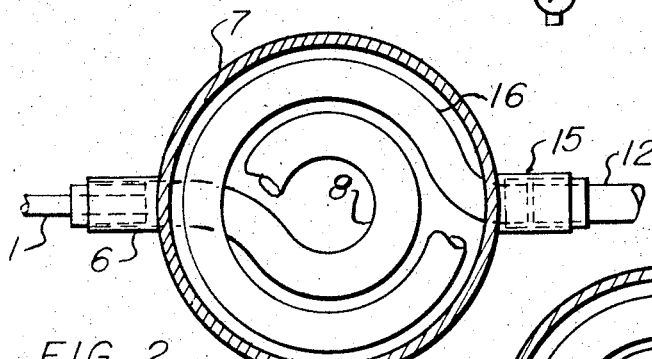
Figure 3:
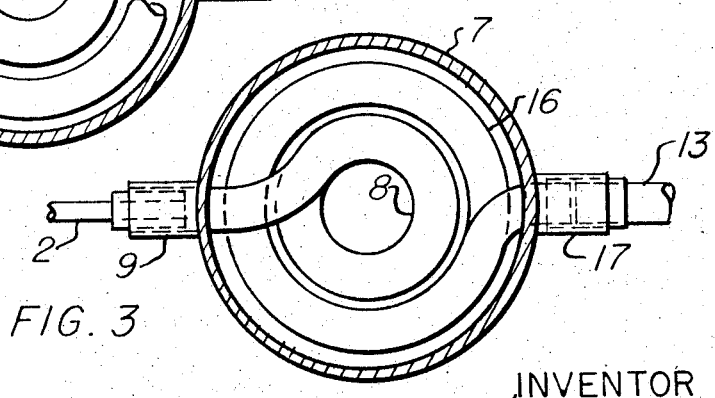
Figure 4:
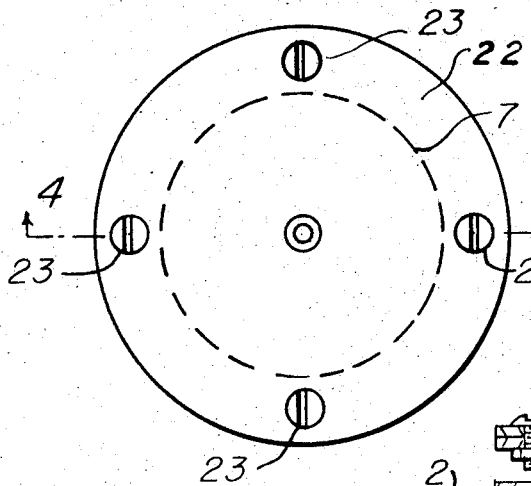
Figure 5:
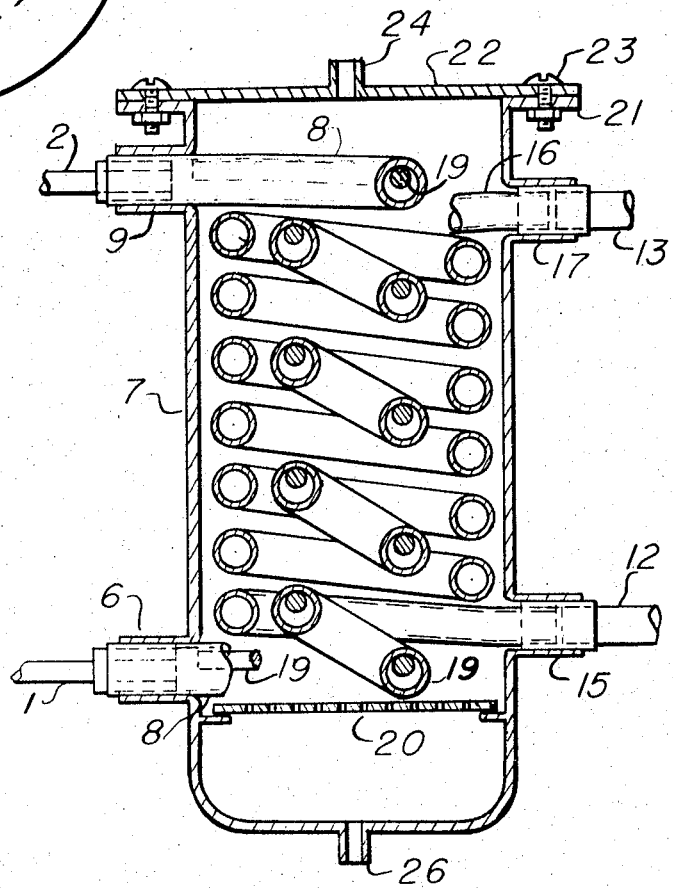

These and other features, capabilities and advantages of the present invention will appear from the subjoined detailed description of one specific embodiment thereof illustrated in the accompanying drawings in which:

FIG. 1 is a side elevation of one embodiment of the present invention;
FIG. 2 is a section on the line 2—2 of FIG. 1;
FIG. 3 is a section on the line 3—3 of FIG. 1;
FIG. 4 is a plan view with the connecting attachment removed from the top of the main container;
FIG. 5 is a transverse section on the line 4—4 of FIG. 4.

In the embodiment shown in FIGS. 1 to 5 inclusive, there is illustrated a first conduit consisting of an inlet portion 1 and an outlet portion 2 connected to a vessel or container 3 containing a liquid mixture of volatile substance. The vessel 3 is provided with a heating unit 4 in order to raise the temperature of the liquid mixture to the evaporation temperature of the volatile substance contained in the liquid mixture. A temperature regulator 5 located in vessel 3 controls the temperature of the liquid mixture in the vessel. The inlet portion 1 extends from vessel 3 to the orifice unit 6 of container 7. Orifice unit 6 is connected to the second conduit 8 which is arranged in a continuous spiral form within container 7. The opposite end of conduit 8 is connected to the orifice unit 9, which in turn connects to the outlet portion 2 of the first conduit. A circulating pump 10 located in the outlet portion 2 of the first conduit provides a constant circulation of the liquid mixture from the vessel 3, through the inlet portion 1 of the first conduit, thence through the second conduit 8, thence through the outlet portion 2 of the first conduit, thence back to vessel 3. Vessel 3 is provided with a funnel 11 through which the liquid mixture is put into vessel 3.

A third conduit consisting of an inlet portion 12 and an outlet portion 13 is connected to a reservoir 14 which contains a distilling medium or coolant such as a cold fluid. The inlet portion 12 of the third conduit extends from reservoir 14 to orifice unit 15 of container 7. Orifice unit 15 is connected to the fourth conduit 16 which is arranged within container 7 in a continuous passage that is external to the second conduit 8. The opposite end of the fourth conduit 16 is connected to the orifice unit 17, which in turn connects to the outlet portion 13 of the third conduit. A pump 18 provides a circulation of the coolant from the reservoir 14, through the inlet portion 12 of the third conduit, thence through the fourth conduit 16, thence through the outlet portion 13 of the third conduit.

The conduit portions 1, 2, 12, and 13 may be composed of any suitable material such as metal, rubber or the like. The conduit 16 is preferably composed of a metallic material. The conduit 8 is composed of a semi-porous substance, such as regenerated cellulose, vegetable parchment, animal membrane, or the like material that can be manufactured with suitable porosity that will permit evaporation of volatile substance through its pores.

When the conduit 8 is made of non-rigid, pliable material it can be supported in a fixed path. By introducing internal support 19 into conduit 8, the path of conduit 8 will conform to the preformed shape of the internal support 19. When the internal support 19 is preformed in a spiral shape, the conduit 8 will become spiral in conformity to said internal support. In like manner the support for conduit 8 may be external to achieve the same purpose as the internal support 19. By the manner described the conduit 8 can be arranged in any preconceived shape or path depending upon the preformed appearance of its support.

The conduit 8 is positioned to rest on a perforated plate 20 in container 7. The perforated plate 20 may be made of metal, glass, or the like material. Container 7 is provided with a flange 21 whereby a plate 22 may be fastened to flange 21 by means of bolts 23. The plate 22 is provided with an orifice 24 by which a vacuum pump 25 is attached. The container 7 is provided with a valved outlet 26 to permit draining of the vaporized substance condensed by the coolant in conduit 16. The container 7 and the plate 22 may be made of metal, glass, or the like material.

Evaporation of volatile substance through the pores of the semipermeable material which comprises conduit 8 occurs when the vapor pressure of the volatile substance is sufficiently high to cause the passage of it vapors through the pores of the semipermeable material. Heating of the liquid mixture that contains the volatile substance will cause this necessary increase in vapor pressure. When a vacuum is applied to the atmosphere surrounding the exterior of the semipermeable conduit, the vapor pressure of the volatile substance contained within the semipermeable conduit will become higher than the vapor pressure of said atmosphere, causing a passage of vapor through the pores of the semipermeable material. Evacuation of the atmosphere in the container 7 by the vacuum pump 25 thereby increases the rate of passage of volatile substance through the pores of the semipermeable conduit.

The vapor that passes through the pores of the semipermeable conduit will condense on any surface it contacts when that surface is colder in temperature than the temperature of the vapor. If the inside surface of container 7 is sufficiently lower in temperature, the vapor that passes through the pores of the semipermeable conduit will condense on said surface. The application of a conduit containing a circulating coolant provides a controlled medium for the condensation of vapors.

The constant recirculation of the liquid mixture through the semipermeable conduit provides a continuous rate of evaporation of vapor through this porous medium. The rate of evaporation is directly proportional to the rate of flow of the liquid mixture. As the rate of flow is increased, the rate of evaporation increases in direct proportion. There is less strain on the semipermeable material when the liquid mixture is drawn through the semipermeable conduit as opposed to a procedure whereby the liquid mixture is pumped into said conduit. Therefore, a higher rate of flow can be accomplished by drawing the liquid mixture through the conduit when said conduit comprises a semipermeable membrane of low tensile strength. When the conduit 8 comprises a non-rigid or flexible material, the evacuation of the atmosphere in the container 7 by the vacuum pump 25 holds the conduit 8 in a distended form thereby assisting the circulating pump 10 to draw the liquid mixture through the conduit 8 thence back to the vessel 3.

When the embodiment such as the embodiment illustrated in FIG. 1 is used to distill liquid mixes for the purpose of recovering potable water, the heated liquid mixture is circulated through the conduit which is made of semipermeable material thereby causing a passage of water vapor through this semipermeable material, which water vapor is then condensed by the cooling medium as potable water. In like manner potable water may be recovered from liquid mixes of soluble salts or from polluted water containing suspended or undissolved solid matter. The same embodiment illustrated in FIG. 1 may be used to concentrate liquid mixtures of raw maple syrup, milk products and the like. Acids and other vaporizable substances may be removed from liquid mixtures in like manner.

It is obvious that various changes and modifications may be made to the details of construction without departing from the general spirit of the invention as set forth in the appended claims.

I claim:

1. In an apparatus for distilling fluids, the combination of a container, a vessel for a supply of liquid to be distilled, inlet and outlet vessel conduits coupled between said vessel and said container for circulating said liquid to be distilled through said apparatus, a reservoir for a supply of liquid coolant, inlet and outlet reservoir conduits coupled between said reservoir and said container for circulating said liquid coolant through said apparatus, circulating pump means mounted respectively on said vessel conduits and reservoir conduits to circulate said liquid to be distilled and liquid coolant through said apparatus, said container having a vacuum means connected to said container to create a vacuum pressure in the container and a drain means connected in the bottom of the container for draining the distillate from the bottom thereof, a first conduit formed of a semipermeable membrane having a preformed support member therefor which is disposed in said container with the ends of the semipermeable conduit connected respectively to the inlet and outlet vessel conduits for passage of said liquid to be distilled therethrough, said semipermeable membrane selectively passing vapor of the distilled liquid therethrough while inhibiting the passage of undesirable constituents, a second non-porous conduit disposed in said container with its ends thereof connected respectively to the inlet and outlet reservoir conduits for passage of said liquid coolant therethrough, said semipermeable conduit and said non-porous conduit shaped in a continuous spiral with the semipermeable spiral conduit disposed concentrically within the non-porous spiral conduit, and heating means mounted in said vessel to heat the fluid to be distilled.

2. In an apparatus for distilling fluids, the combination of a container and a conduit disposed in said container, said conduit formed of a semipermeable membrane and having a preformed support member mounted in the container on which said conduit is adapted to rest so as to maintain a predetermined path for a liquid to be distilled which is passed through said conduit, said semipermeable membrane selectively passing vapor of the distilled liquid therethrough while inhibiting the passage of undesirable constituents, said conduit connected to first inlet and outlet openings formed in said container, a second conduit formed of a non-porous material and disposed in said container in spaced relationship to said first conduit and in indirect fluid communication with the first conduit, said second conduit connected to second inlet and outlet openings formed in said container for conducting liquid coolant therethrough, a vessel containing a liquid to be distilled connected to the said container and communicating with said semipermeable conduit at the first inlet and outlet openings in said container, so as to conduct the liquid to be distilled through the semipermeable conduit, a reservoir containing a liquid coolant connected to said container and communicating with said second inlet and outlet opening in said container for conducting said fluid coolant through said non-porous conduit, vacuum means connected to the container to create a vacuum pressure in the container to facilitate the distillation of the liquid to be distilled, and a valved outlet in the bottom of the container for draining distillate from the container.

3. The combination of claim 2 wherein a heating means is connected to said vessel to maintain the liquid to be distilled at an elevated temperature to facilitate the passage of vapor from the distilling fluid through the pores of the semipermeable conduit.

4. The combination of claim 2 wherein the semipermeable conduit and the non-porous conduit are shaped in a continuous spiral with the semipermeable conduit disposed concentrically within the non-porous spiral conduit.

5. The combination of claim 2 wherein the vessel and reservoir have mounted thereon pump means for circulating respectively liquid to be distilled through said semipermeable conduit and liquid coolant through said non-porous conduit.

References Cited

UNITED STATES PATENTS

| | | | |
|---|---|---|---|
| 2,386,826 | 10/1945 | Wallach et al. | 202—197 |
| 3,060,119 | 10/1962 | Carpenter | 210—22 |
| 3,129,145 | 4/1964 | Hassler | 203—10 |
| 3,131,143 | 4/1964 | Ferrari | 159—2 |
| 3,161,574 | 12/1964 | Elain | 202—236 |
| 3,303,105 | 2/1967 | Konikoff et al. | 203—11 |
| 3,340,186 | 9/1967 | Weigl | 203—11 X |
| 3,361,645 | 1/1968 | Bodell | 202—236 |
| 3,405,058 | 10/1968 | Miller | 210—23 |

OTHER REFERENCES

"Vaporization Through Porous Membranes" by M. E. Findley, May 15–18, 1966.

WILBUR L. BASCOMB, JR., *Primary Examiner.*

E. E. DRUMMOND, *Assistant Examiner.*

U.S. Cl. X.R.

202—187, 189, 205; 203—11